US008127301B1

(12) United States Patent
Waldspurger et al.

(10) Patent No.: US 8,127,301 B1
(45) Date of Patent: Feb. 28, 2012

(54) SCHEDULING SELECTED CONTEXTS IN RESPONSE TO DETECTING SKEW BETWEEN COSCHEDULED CONTEXTS

(75) Inventors: Carl Waldspurger, Palo Alto, CA (US); John Zedlewski, Cambridge, MA (US); Andrei Dorofeev, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1257 days.

(21) Appl. No.: 11/707,411

(22) Filed: Feb. 16, 2007

(51) Int. Cl.
*G06F 9/46* (2006.01)
*G06F 9/455* (2006.01)
(52) U.S. Cl. ............ 718/106; 718/1; 718/102; 718/108
(58) Field of Classification Search .................. 718/106, 718/1
See application file for complete search history.

(56) References Cited

U.S. PATENT DOCUMENTS

| | | | |
|---|---|---|---|
| 6,075,938 A | 6/2000 | Bugnion et al. | |
| 6,601,084 B1 * | 7/2003 | Bhaskaran et al. | 718/105 |
| 6,996,822 B1 | 2/2006 | Willen et al. | |
| 7,036,123 B2 | 4/2006 | Dorofeev et al. | |
| 7,167,916 B2 | 1/2007 | Willen et al. | |
| 7,222,218 B2 | 5/2007 | Dutt et al. | |
| 7,318,090 B1 | 1/2008 | Fairman et al. | |
| 7,424,712 B1 * | 9/2008 | Sistare et al. | 718/102 |
| 7,730,486 B2 | 6/2010 | Herington | |
| 7,784,057 B2 | 8/2010 | Davis et al. | |
| 7,810,094 B1 | 10/2010 | McClure et al. | |
| 7,954,102 B2 | 5/2011 | Okawara | |
| 2005/0097228 A1 * | 5/2005 | Flautner et al. | 710/1 |
| 2005/0132364 A1 | 6/2005 | Tewari et al. | |
| 2006/0143616 A1 | 6/2006 | Koike et al. | |
| 2007/0050779 A1 | 3/2007 | Hayashi | |
| 2007/0204268 A1 | 8/2007 | Drepper et al. | |
| 2008/0022280 A1 | 1/2008 | Cherkasova et al. | |
| 2008/0059712 A1 * | 3/2008 | Fedorova | 711/130 |
| 2008/0092142 A1 * | 4/2008 | Tran et al. | 718/105 |
| 2010/0037234 A1 | 2/2010 | Udupa et al. | |
| 2010/0205602 A1 | 8/2010 | Zedlewski et al. | |

OTHER PUBLICATIONS

VMware. "VMware ESX Server 2: Architecture and Performance Implications." Aug. 3, 2005. <http://www.vmware.com/pdf/esx2_performance_implications.pdf>.*
Carl Waldspurger et al., "Alternating Scheduling and Descheduling of Coscheduled Contexts", U.S. Appl. No. 11/707,287 filed Feb. 16, 2007.
Carl Waldspurger et al., "Defining and Measuring Skew Between Coscheduled Contexts", U.S. Appl. No. 11/707,729 filed Feb. 16, 2007.
Carl Waldspurger et al., "Detecting and Responding to Skew Between Coscheduled Contexts", U.S. Appl. No. 11/707,380 filed Feb. 16, 2007.
Haoqiang Zheng et al., "Implict Co-Scheduling of CPUS", U.S. Appl. No. 13/105,396 filed May 11, 2011.
Kenneth M. Mackenzie, "An Efficient Virtual Network Interface in the FUGU Scalable Workstation", Feb. 1998, Massachusetts Institute of Technology, pp. 1-129.
ESX 4.0, May 20, 2009, http://www.vmware.com/company/news/releases/vsphere-ga.html.

* cited by examiner

*Primary Examiner* — Emerson Puente
*Assistant Examiner* — Adam Lee

(57) ABSTRACT

Management of contexts that execute on a computer system is described. More specifically, context scheduling in a virtual machine environment is described. A set of coscheduled contexts is monitored. If a skew metric associated with any one of the coscheduled contexts fails to satisfy a condition, then all coscheduled contexts in the set of coscheduled contexts not already descheduled are descheduled. After the contexts are descheduled, a subset of the set of coscheduled contexts is scheduled before the remainder of the set of coscheduled contexts.

27 Claims, 4 Drawing Sheets

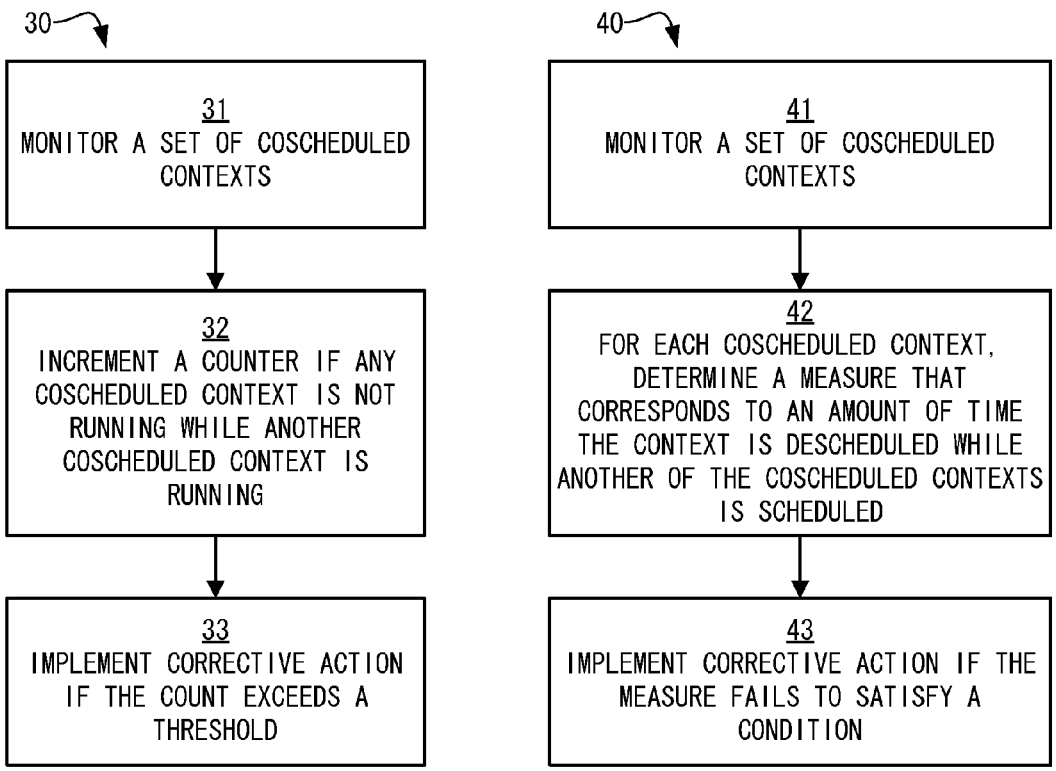

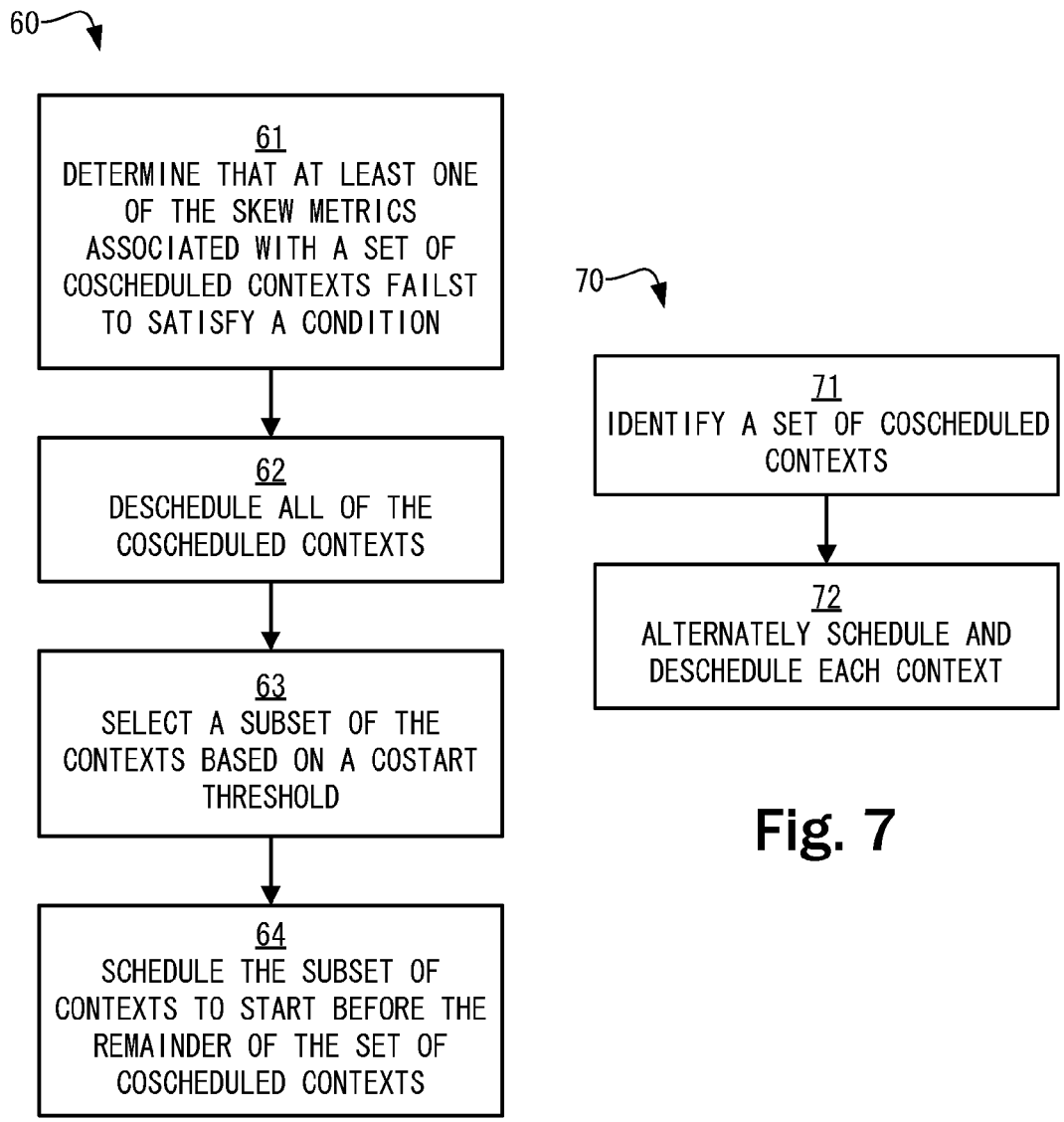

SCHEDULING SELECTED CONTEXTS IN RESPONSE TO DETECTING SKEW BETWEEN COSCHEDULED CONTEXTS

BACKGROUND OF THE INVENTION

1. Field of the Invention

This invention relates to context scheduling in general, and more particularly to processor scheduling in a virtual machine environment.

2. Description of the Related Art

As is well known in the field of computer science, a virtual machine (VM) is an abstraction—a "virtualization"—of an actual physical computer system. The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how, it is implemented, virtualization can also provide greater security, since the virtualization can isolate potentially unstable or unsafe software so that it cannot adversely affect the hardware state or system files required for running the physical (as opposed to virtual) hardware.

A virtual machine or "guest" is installed on a "host platform," or simply "host," which includes system hardware and one or more layers or co-resident components comprising system-level software, such as an operating system or similar kernel, or a virtual machine monitor or hypervisor, or some combination of these. Each VM will typically have both virtual system hardware and guest system software. A single VM may be configured with more than one virtualized processor. To permit computer systems to scale to larger numbers of concurrent threads, systems with multiple processors have been developed. These symmetric multi-processor (SMP) systems are available as extensions of the personal computer platform. Essentially, an SMP system is a hardware platform that connects multiple processors to a shared main memory and shared input/output devices. Virtual machines may also be configured as SMP VMs.

In the field of processor scheduling, the ability to simultaneously schedule multiple "contexts" (e.g., virtual processors) is commonly referred to as "coscheduling" or "gang scheduling." There are a number of reasons why coscheduling is beneficial. For instance, coscheduling is generally used to ensure that when multiple, cooperating contexts need to communicate or synchronize with each other, then they will all be ready to do so at the same time. When the contexts are virtual processors associated with a virtual machine, coscheduling is also desirable to maintain the illusion presented to the guest operating system that it is running on a dedicated physical multiprocessor. Synchronous execution may improve performance significantly, and may even be required for correctness in some cases where inter-processor operations are expected to complete quickly.

However, strict coscheduling can cause fragmentation, with the result that some physical processors may remain idle or may be underutilized even when the overall demand for processor time is high. For example, consider the problem of scheduling two CPU-bound virtual machines on a physical machine with two processors: VM1, a uniprocessor VM with a single virtual processor, and VM2, an SMP VM with two virtual processors that must be coscheduled. When VM1 is scheduled, VM2 cannot run because both of its virtual processors must be coscheduled but only one physical processor is available. As a result, even though the second physical processor is available, it will remain idle, even though there is a VM ready to run (e.g., VM2). Thus, the computer system's resources are not efficiently utilized, reducing overall performance.

SUMMARY OF THE INVENTION

Management of contexts that execute on a computer system is described. More specifically, context scheduling in a virtual machine environment is described. Times at which a context transitions from a scheduled state to a descheduled state and times at which the context transitions from a descheduled state to a scheduled state are recorded for each context. Skew is detected using the recorded times. The amount of skew can be quantified, and a corrective action is triggered if the amount of skew fails to satisfy a threshold value.

BRIEF DESCRIPTION OF THE DRAWINGS

FIGS. 3, 4, 5, 6 and 7 are flowcharts of methods for managing coscheduled contexts.

DETAILED DESCRIPTION

Figure 1:
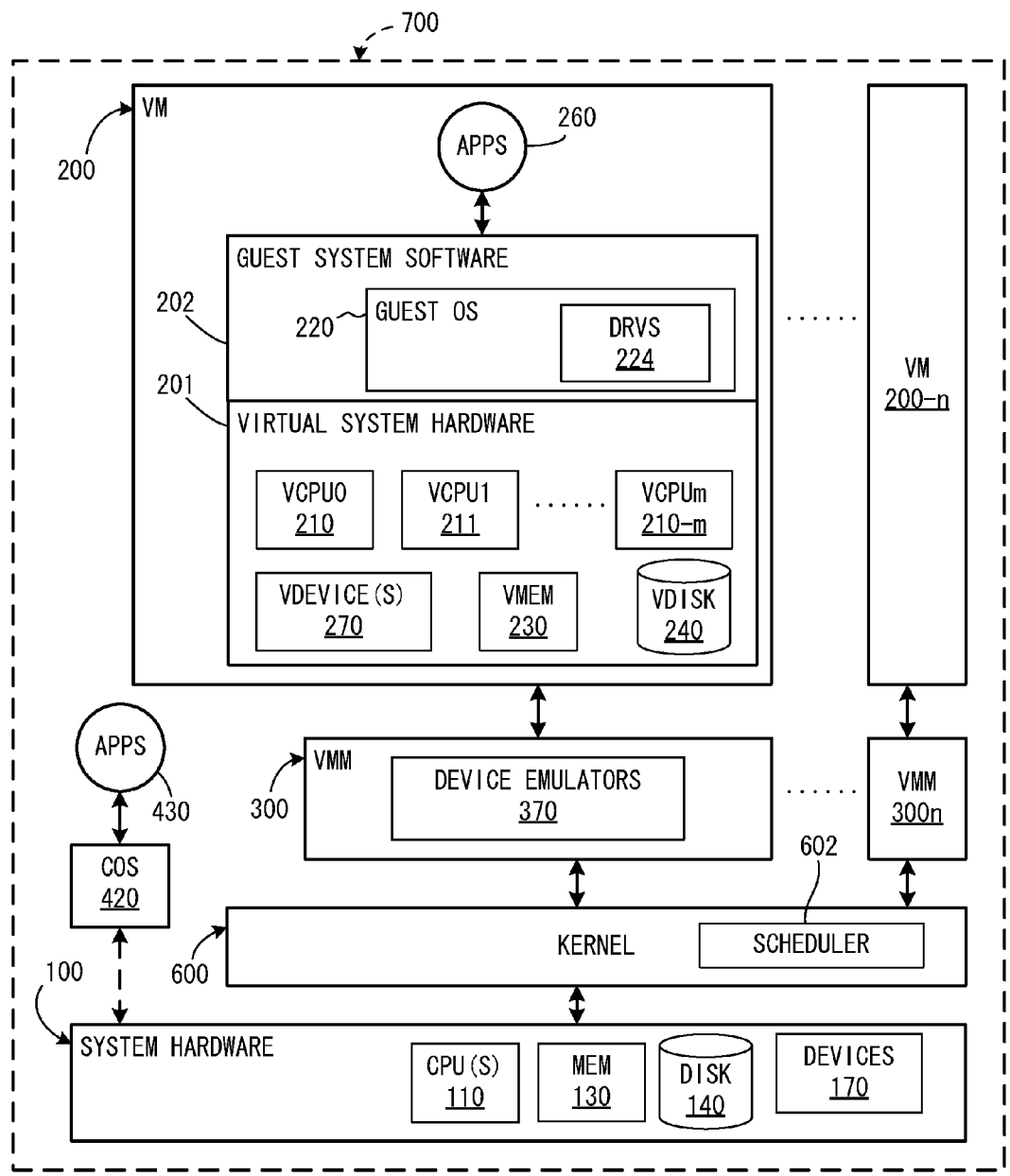
FIG. 1 illustrates an exemplary non-hosted virtual machine.

The present invention pertains generally to the tracking and management of coscheduled "contexts" that execute on a computer system. A context may represent different software constructs, depending on the underlying system. A context may be a process associated with an application, or a thread that is associated with a process.

A context may instead be a virtual machine or a "virtual processor" associated with a virtual machine. In one embodiment, the present invention pertains to coscheduling a group of virtual machines. For example, two virtual machines may be cooperating servers as part of a multi-tier service that would be improved if both of the virtual machines are coscheduled (regardless of the number of virtual processors per virtual machine). Similarly, the present invention pertains to coscheduling any group of applications that collaborate on the host (such as a database server and an application server that work together to process a transaction). The context sets may be permanent (e.g., as in the case of virtual processors that are part of a virtual machine) or transient (e.g., as in the case of virtual machines or applications that collaborate on a transaction only until the transaction is completed).

"Coscheduling" and "gang scheduling" refer to the concurrent or simultaneous scheduling of a set of cooperating contexts that may need to communicate and/or synchronize with one another. As will be seen, the present invention allows "relaxed" coscheduling in addition to "strict" coscheduling, and in particular the application of relaxed coscheduling to non-batch tasks/contexts. Thus, although coscheduled contexts are intended to be scheduled (e.g., executed) simultaneously (strict coscheduling), according to the invention some contexts within the set of coscheduled contexts may be scheduled while others are temporarily descheduled (relaxed coscheduling). Accordingly, depending on the manner in which the term "coscheduled contexts" is used, it may herein refer either to cooperating contexts that are scheduled concurrently, or to cooperating contexts that are not scheduled concurrently because of a policy of relaxed coscheduling. Coscheduled or cooperating contexts may also be referred to "sibling contexts."

If there is a mix of scheduled and descheduled contexts, so that some contexts in a set of coscheduled contexts are not executing at the same time as others in the set, then their execution is said to be "skewed." The notion of coscheduling "skew" is intended to quantify the amount of unsynchronized scheduling or execution between coscheduled contexts.

The present invention pertains more specifically to the definition, detection, measurement and management of skew between coscheduled contexts. The present invention introduces several mechanisms and policies that track the amount of skew during periods of relaxed coscheduling and that, when warranted, implement corrective actions to reduce the amount of skew. For example, the amount of skew per context may be defined as the amount of time that a context was descheduled while other contexts in the set of coscheduled contexts were scheduled. If a condition applied to the amount of skew is not satisfied (e.g., a predefined threshold value is exceeded), then one or more corrective actions can be implemented. Corrective actions introduced herein include skew reduction policies referred to as "costop," "costart" and "coswap." A costop policy may include descheduling some contexts (relaxed costop) or all contexts (strict costop) in the set of coscheduled contexts. A costart policy may include scheduling some (relaxed costart) or all (strict costart) contexts in the set of coscheduled contexts to begin execution at the same time. A coswap policy may include rapidly and alternately scheduling and descheduling contexts on a physical processor, so that each context makes forward progress and does not get too far ahead or behind its siblings, thereby bounding the amount of skew. Additional information regarding the definition, detection, measurement and management of skew between coscheduled contexts is provided in conjunction with FIGS. 3, 4, 5, 6 and 7, below.

Figure 2:
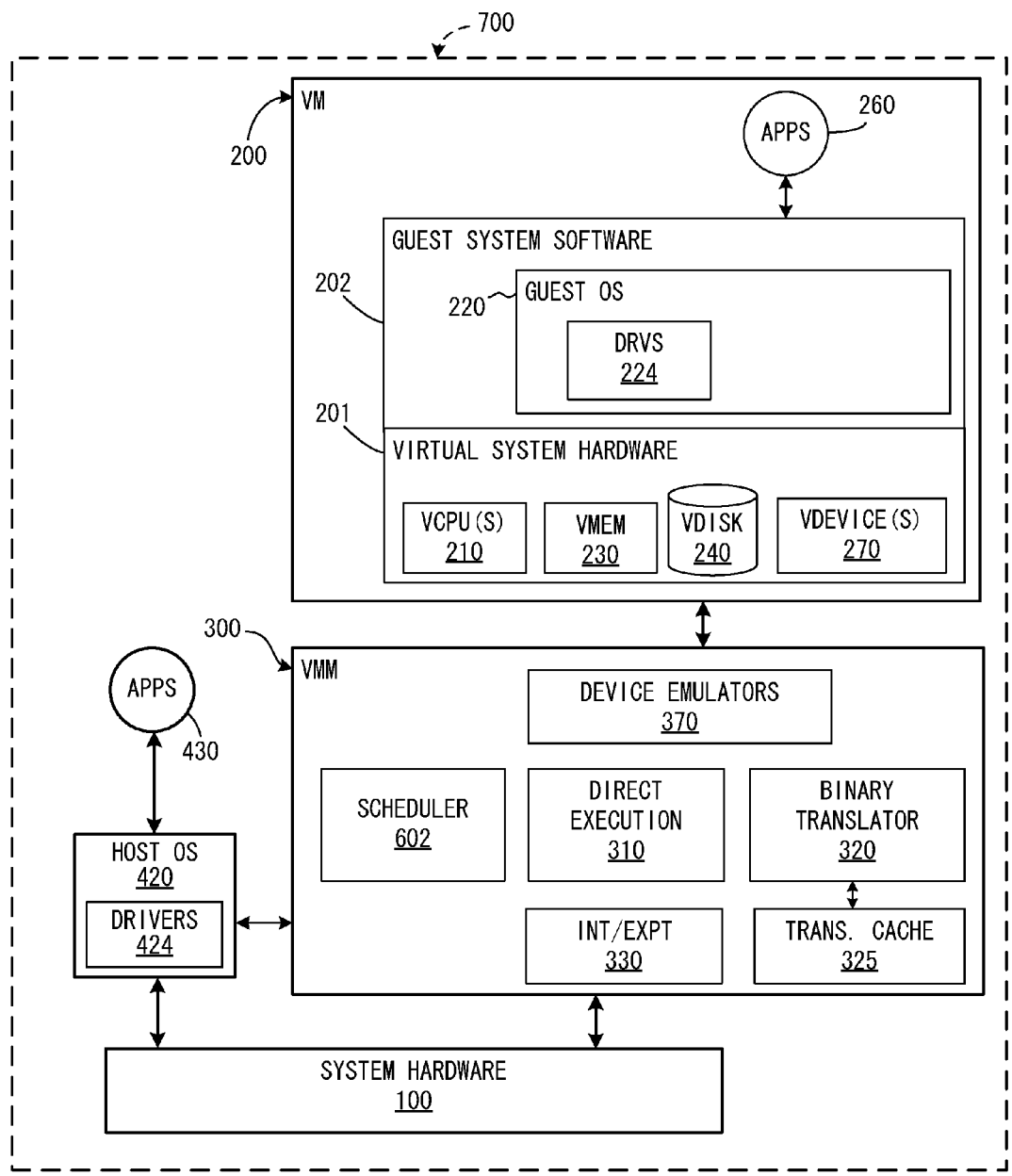
FIG. 2 illustrates an exemplary hosted virtual machine.

First, FIGS. 1 and 2 show virtual machines (VMs) and their functions. FIG. 1 shows one possible arrangement of a computer system 700 that implements virtualization. A virtual machine or "guest" 200 is installed on a "host platform," or simply "host," which will include system hardware, that is, a hardware platform 100, and one or more layers or co-resident components comprising system-level software, such as an operating system or similar kernel, or a virtual machine monitor (VMM) or hypervisor (see below), or some combination of these. The system hardware typically includes one or more processors 110, memory 130, some form of mass storage 140, and various other devices 170. Additionally, an operating system such as optional console operating system (COS) 420, and hosted application(s) 430, are shown with an optional coupling to system hardware 100.

Each VM 200 will typically have both virtual system hardware 201 and guest system software 202. The virtual system hardware typically includes at least one virtual central processing unit (CPU) 210, virtual memory 230, at least one virtual disk 240, and one or more virtual devices 270. Note that a disk—virtual or physical—is also a "device," but is usually considered separately because of the important role of the disk. All of the virtual hardware components of the VM 200 may be implemented in software using known techniques to emulate the corresponding physical components. The guest system software 202 includes a guest operating system (OS) 220 and drivers (DRVS) 224 as needed for the various virtual devices 270.

A single VM 200 may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading" (SMT), in which more than one logical CPU (hardware thread) operates simultaneously on a single chip, but in which the logical CPUs flexibly share some resource such as caches, buffers, functional units, etc. This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s) 210-0, 210-1, . . . , 210-m. Executable files will be accessed by the guest OS 220 from the virtual disk 240 or virtual memory 230, which will be portions of the actual physical disk 140 or memory 130 allocated to that VM. Once an application 260 is installed within the VM 200, the guest OS 220 retrieves files from the virtual disk 240 just as if the files had been pre-stored as the result of a conventional installation of the application. The design and operation of virtual machines are well known in the field of computer science.

Some interface is generally required between the guest software within a VM 200 and the various hardware components and devices in the underlying hardware platform 100. This interface—which may be referred to generally as "virtualization software"—may include one or more software components and/or layers, possibly including one or more of the software components known in the field of virtual machine technology as "virtual machine monitors" (VMMs) 300, . . . , 300-n, "hypervisors," or virtualization "kernels" 600. Because virtualization terminology has evolved over time and has not yet become fully standardized, these terms do not always provide clear distinctions between the software layers and components to which they refer. For example, "hypervisor" is often used to describe both a VMM 300 and a kernel 600 together, either as separate but cooperating components or with one or more VMMs incorporated wholly or partially into the kernel itself; however, "hypervisor" is sometimes used instead to mean some variant of a VMM 300 alone, which interfaces with some other software layer(s) or component(s) to support the virtualization. Moreover, in some systems, some virtualization code is included in at least one "superior" VM (e.g., VM 200) to facilitate the operations of other VMs. Furthermore, specific software support for VMs 200, . . . , 200-n may be included in the host OS itself. Unless otherwise indicated, the invention described below may be used in virtualized computer systems having any type or configuration of virtualization software.

Moreover, FIG. 1 shows virtual machine monitors 300, . . . , 300-n that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s) 210-0, . . . , 210-m, the virtual memory 230, the virtual disk 240, and the virtual device(s) 270, are shown as being part of the VM 200 for the sake of conceptual simplicity. In actuality, these "components" are usually implemented as software emulations 370 included in the VMM 300. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS 220 could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS 220 (in particular, its kernel) is specifically designed to support such an interface. According to this view, having, for example, an off-the-shelf version of Microsoft Windows XP as the guest OS 220 would not be consistent with the notion of para-virtualization. Others define para-virtualization more broadly to include any guest OS 220 with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration (shown in FIG. 2) and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM 300. The Workstation product of VMware, Inc., of Palo Alto, Calif., is an example of a hosted, virtualized computer system, which is also explained in U.S. Pat. No. 6,496,847 (Bugnion et al., "System and Method for Virtualizing Computer Systems," 17 Dec. 2002).

As illustrated in FIG. 1, in many cases, it may be beneficial to deploy VMMs 300, . . . , 300-n on top of a software layer—a kernel 600—constructed specifically to provide efficient support for the VMs 200, . . . , 200-n. This configuration is frequently referred to as being "non-hosted." Compared with a system in which VMMs 300, . . . , 3000-n run directly on the hardware platform 100, use of a kernel 600 offers greater modularity and facilitates provision of services (for example, resource management) that extend across multiple virtual machines. Compared with a hosted deployment, a kernel 600 may offer greater performance because it can be co-developed with the VMM and be optimized for the characteristics of a workload consisting primarily of VMs/VMMs. The kernel 600 also handles any other applications running on it that can be separately scheduled, as well as an optional console operating system (COS) 420 that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

In addition to device emulators 370, FIG. 2 also illustrates some of the other components that are also often included in the VMM 300 of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320 with associated translation cache 325 may be included to provide execution speed while still preventing the VM from directly executing certain privileged instructions (see U.S. Pat. No. 6,397,242, Devine et al., "Virtualization System Including a Virtual Machine Monitor for a Computer with a Segmented Architecture," 28 May 2002).

The optional console OS in FIG. 1 may be of the same type as the host OS in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson et al., "Computer Configuration for Resource Management in Systems Including a Virtual Machine," 1 Nov. 2005).

As a generalization, some form of "virtualization software" executes between system hardware 100 and one or more VMs 200. The virtualization software uses the resources of the system hardware 100, and emulates virtual system hardware 201, on which guest system software 202 and guest applications 260 appear to execute. Thus, virtualization software typically comprises one or more device emulators 370, and either includes or executes in conjunction with some form of system software for accessing and controlling the system hardware 100. The virtualization software may provide full virtualization or partial virtualization. In the non-hosted virtual computer system of FIG. 1, the virtualization software may be considered to comprise the VMMs 300, along with some portions of the kernel 600, such as one or more software modules that may share physical system resources between multiple VMs. The virtualization software operates in conjunction with system software that is also contained in the kernel 600. Similarly, in the hosted virtual computer system of FIG. 2, the virtualization software may be considered to primarily comprise the VMM 300, which operates in conjunction with system software in the form of the host OS 420. Various other configurations for virtualization software and system software are also possible.

This invention may be used to advantage in both a hosted and/or a non-hosted virtualized computer system, in which the included virtual machine(s) may be fully or para-virtualized, and in which the virtual machine(s) have any number of virtualized processors, which may be of any type (including multi-cored, multi-threaded, or some combination). The invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

FIGS. 3, 4, 5, 6 and 7 are flowcharts 30, 40, 50, 60 and 70, respectively, of methods for managing coscheduled contexts. Although specific steps are disclosed in these flowcharts, such steps are exemplary. That is, the invention is well-suited to performing various other steps or variations of the steps recited in the flowcharts. The steps in the flowcharts are not necessarily performed in the sequence illustrated. Furthermore, the features or steps described in conjunction with one flowchart can be used alone or in combination with the features or steps described in one or more of the other flowcharts. The steps described by these flowcharts can be implemented by a computer system as computer-executable instructions stored in a computer-readable medium.

With reference first to FIG. 3, in block 31, a set of coscheduled contexts is identified and monitored.

In block 32, at periodic intervals, a check is performed to see if any context in the set is descheduled (e.g., not executing) while any other context in the set is scheduled. There may be a counter associated with each context in a set of contexts, and/or there may be a counter associated with the entire set of contexts. Thus, for example, there may be a counter associated with each virtual CPU (VCPU) and/or with each VM. If any context in the set is descheduled while any other context in the set is scheduled, then (depending on the implementation) the counter for that context and/or the counter for the set of contexts is incremented. If not, the counter(s) may or may not be decremented, again depending on the implementation. That is, if all sibling contexts are scheduled, then the counter for the set of contexts, or any per-context counter that has a counter greater than zero, may either be decremented or left unchanged, depending on how the counter(s) are being implemented.

Block 32 can be implemented as follows. With reference also to FIG. 1, each physical processor (e.g., CPU 110) may arrange for a periodic callback that may be driven by a physical timer interrupt or another such mechanism. When the callback is issued, the context scheduler 602 (which may be implemented in kernel 600 or VMM 300, for example, of a non-hosted and hosted configuration, respectively) checks each physical processor to determine which context it is executing. In other words, the scheduler 602 determines whether or not each sibling context is scheduled to execute. If, at the instant of the callback or interrupt, any one of the sibling contexts is not scheduled (that is, a context is observed as being in the descheduled state) while another of the sibling contexts is scheduled, then a counter for the sibling context that is not executing and/or a counter for the family of sibling contexts (depending on the implementation, as mentioned above) is incremented; otherwise, the counter(s) may be optionally decremented.

A context that is "idle" or in a formal "halt" state (e.g., as a result of the HLT instruction for the x86 processor architecture) may be considered to be scheduled or running even if it is not. For example, an idle VCPU may execute a guest instruction to halt the VCPU until the next virtual interrupt. Because the guest OS 220 cannot observe the difference between a halted VCPU that is still scheduled and a halted VCPU that has been descheduled transparently by the virtualization platform (e.g., kernel 600 or VMM 300), an idle or halted VCPU can be treated as if it were scheduled or running for purposes of measuring skew. In general, with regard to the discussion of FIG. 3 as well as the figures below, a context is considered scheduled even if it is idle or in a halt state.

In block 33 of FIG. 3, a corrective action is implemented if a skew counter exceeds a predefined threshold value (a skew threshold). A skew threshold can be defined for each context, and/or a skew threshold can be defined for a set of contexts. A different skew threshold can be defined for each context within a set, and each set can have a different skew threshold. In one embodiment, the value of the skew threshold depends on the current activity associated with the context. That is, for example, a determination can be made as to whether a VCPU is running kernel code or spinning on a lock, and the skew threshold could be varied accordingly. Thus, if a context is detected to be in a state that makes coscheduling particularly important (e.g., executing kernel code or spinning on a lock) or, conversely, particularly unimportant, then the skew threshold can be adjusted up or down accordingly. Alternatively, contexts may use a defined application programming interface (API) to indicate when they are executing code that is "coscheduling critical" or "coscheduling irrelevant."

System performance can be monitored and each skew threshold value can be adjusted accordingly. Currently, any such adjustment is made manually but automatic adjustments are contemplated. Corrective actions introduced herein include skew reduction policies referred to as "costop" (relaxed and strict), "costart" (relaxed and strict), and "coswap." Corrective actions are discussed further in conjunction with FIGS. 5, 6 and 7, below. In one embodiment, just as the skew threshold can depend on the particular activity associated with the context, so can the choice of corrective action.

With reference next to FIG. 4, in block 41, a set of coscheduled contexts is identified and monitored to detect skew.

In block 42, if skew is detected, an amount of skew is determined. In essence, the amount of time that a context is descheduled while at least one other context in the set is scheduled is measured. In general, for each context in the set, an "event count" is recorded when a context transitions from a scheduled state to a descheduled state, and an event count is recorded when the context transitions from a descheduled state to a scheduled state. The type of event count that is recorded depends on the type of skew metric.

Various skew metrics may be used to indicate the amount of time that one context is ahead of another in terms of execution or scheduling, or conversely to indicate the amount of time that one context is lagging behind another in similar terms.

A skew metric may be a relatively precise measurement of the actual amount of time that a context is descheduled while another context is scheduled, measured in units of real time or processor cycles. For example, for each context (e.g., for each VCPU), the context scheduler may track and record the actual time of each transition between scheduled and descheduled states. Alternatively, the context scheduler may track and record a number of processor cycles at each scheduling transition.

A skew metric may instead be obtained by measuring an attribute that increases, perhaps steadily, with the passage of time. For example, the context scheduler can count the number of memory references, cache misses, and/or instructions executed (e.g., retired) during periods in which a context is descheduled while a sibling context is scheduled. Counts of this nature provide a valuable measure of skew in terms of the amount of work performed (e.g., instructions retired) as opposed to a metric based on elapsed time or processor cycles.

Also, a skew metric may be based on a statistical evaluation of information that is gathered as contexts are scheduled and descheduled. For example, the variance or standard deviation associated with samples of scheduled times provides a useful measure of skew.

Skew may be measured separately for each context in a set of contexts and/or collectively for the entire set of contexts. Thus, for example, skew may be measured for each VCPU and/or for the VM that includes the VCPUs, as well as for other VMs and their respective families of VCPUs.

Skew may be measured per instance or cumulatively. That is, a context's instance skew is associated with a single period during which the context was descheduled while one or more of its siblings were scheduled. The instance skew metric is reset to zero after each such instance.

A context's cumulative skew is accumulated over multiple instances of skew between sibling contexts. In one implementation, a context's cumulative skew is not decreased when the context is scheduled to run along with its siblings. In another implementation, a context's cumulative skew is decreased when the context is scheduled to run along with one of its siblings. In the latter case, a factor may be applied to the amount of the decrease.

For example, with reference to FIG. 1, VCPU0 may run for a period of 1000 microseconds (μs) while VCPU1 is descheduled; at this point, VCPU1 would have a cumulative skew of 1000. Then, for example, VCPU0 and VCPU1 may both be scheduled for a period of 500 μs. In one implementation, VCPU1's cumulative skew would be reduced by 500. In another implementation, a factor (which may be greater than or less than 1.0) is applied to the value of 500; that is, the amount by which the cumulative skew is reduced may be weighted differently than the amount by which it is increased. In one implementation, the cumulative skew is not reduced when both VCPU0 and VCPU1 are scheduled. In other words, in one implementation, a VCPU's cumulative skew is only reduced if it is scheduled while all of its siblings are descheduled.

Furthermore, an aging mechanism of some sort (e.g., an exponentially weighted moving average or the like) can be applied to individual skew values that constitute the cumulative skew value, so that more recent instances of skew are more heavily weighted while past instances of skew are given less weight. Accordingly, a cumulative skew value may "time out" (be reset to zero) if there are no recent instances of skew between sibling contexts. Moreover, a function (e.g., a non-linear function) can be applied to individual skew values that constitute the cumulative skew value, so that some of the individual skew values are weighted differently from the others.

In systems with simultaneous multi-threading (SMT) features (also known as hyper-threading), several contexts can run simultaneously on a single physical processor, while sharing many important execution resources of that processor. Because the contexts share a resource, they each run at less than 100 percent of full speed. Thus, for example, if one VCPU0 is sharing a hyper-threaded physical processor with another VCPU1 so that each VCPU is running at half speed, while a sibling VCPU2 has sole access to another physical processor and is running at full speed, skew can be introduced because VCPU2 is running faster than the other two VCPUs. In general, the amount of useful work done by a context in a given amount of time may depend on the activity level of the other contexts running on the same physical processor. The present invention can appropriately adjust its measurement of skew to account for SMT effects. For instance, in a skew situation where one context is running at half speed, for example, due to contention on its SMT processor, its skew measure may be advanced at half the full rate. In general, skew per context can be accumulated at less than the full rate to account for effects of SMT when appropriate to do so.

Also, physical processors may run slower due to, for example, power-related throttling (processor power management). For example, physical processors may reduce their clock speed in order to conserve power or reduce heat. As in the SMT example just described, a context running at, for example, half speed due to power throttling may introduce skew between it and its sibling contexts. As in the SMT example, skew per context can be accumulated at less than the full rate to account for effects such as power throttling.

Returning to FIG. 4, in block 43, the context scheduler can use a periodic callback to poll the current event counts, determine measures (values) of skew, and compare the skew metric to a predefined condition (e.g., a skew threshold). Instead of polling, the context scheduler can use an interrupt-driven approach, in which callbacks are issued after scheduling VCPUs on physical CPUs to execute after a specified amount of time that is based on, for example, the skew threshold value; that is, a callback is registered to fire at a particular time (e.g., based on the skew threshold), and the callback is issued by arranging for a timer interrupt to be delivered at that particular time. In the interrupt-driven approach, if the context scheduler determines that a context is starting to experience skew relative to its siblings, then the timer is started; when the timer reaches the skew threshold value, a callback is issued to determine the amount of skew associated with that context.

If the condition is not satisfied (e.g., if the skew threshold value is exceeded), a corrective action can be implemented, as described in the figures to follow. The condition may pertain to the instance skew or the cumulative skew discussed above. That is, for example, corrective action may be taken if a context's instance skew exceeds a threshold or if a context's cumulative skew exceeds a threshold value. One condition or threshold value may be defined for instance skew and a different condition or threshold value may be defined for cumulative skew. A different threshold value can also be defined for each context (e.g., per VM and/or per VCPU). System performance can be monitored and each skew threshold value can be adjusted accordingly. Also, as noted in the discussion of FIG. 3 above, the skew threshold and/or the corrective action can depend on the current activity associated with the context.

With reference now to FIG. 5, various costop policies are described. In block 51, a skew metric associated with a set of coscheduled contexts fails to satisfy a condition (e.g., refer to the discussion of FIGS. 3 and 4, above).

In block 52, in one implementation, all of the coscheduled contexts in the set are descheduled. In another implementation, only a subset of the coscheduled contexts is descheduled. In some instances, only one context (the context with the highest skew metric) may exceed the skew metric applied in block 51, in which case that context would remain scheduled while the other contexts in the set are descheduled. There may be other instances in which multiple contexts exceed the skew metric applied in block 51, in which case only those contexts remain scheduled while the remaining contexts in the set are descheduled. In a sense, the context scheduler forces descheduling of those contexts that are "ahead" while allowing the contexts that are "behind" to continue execution. The former implementation can be referred to as strict costop, while the latter can be referred to as relaxed costop. A choice of relaxed costop versus strict costop can also depend on the particular work being done by the contexts. For example, a strict costop policy may be appropriate for VCPUs that are running critical kernel code, while a relaxed costop policy may be appropriate for VCPUs running userspace code.

In yet another implementation, which may be referred to as "partially relaxed costop," another threshold value (a relaxed costop threshold), that is less than or equal to the value of the skew threshold applied in block 51, is used to select the members of the subset to be costopped. The costop threshold can be expressed as a fraction or percentage of the skew threshold. In this implementation, in response to block 51, only those coscheduled contexts in the set that have a skew metric that is below the costop threshold are costopped. Thus, if only one of the coscheduled contexts exceeds the skew threshold applied in block 51 and therefore would remain scheduled, other contexts in the set may also remain scheduled even if their respective skew metrics do not exceed the skew threshold. A different costop threshold can also be defined for each context (e.g., per VM and/or per VCPU).

Operation according to a relaxed (or partially relaxed) costop policy can continue according to the relaxed costop policy until all of the skew metrics associated with the set of coscheduled contexts are satisfactory. Costart policies in instances of strict costop are described in conjunction with FIG. 6, below.

Relaxed and partially relaxed costop policies can reduce the number of coscheduling operations relative to strict costop, reducing the number of instances of coscheduling fragmentation and thereby reducing the number of instances in which physical CPUs are not fully utilized. Thus, relaxed costop can improve overall performance. These benefits become more evident as the number of VCPUs per VM increases.

FIG. 6 describes various costart policies. In essence, the costart policies described in conjunction with FIG. 6 apply to those instances in which all contexts in a set of coscheduled contexts are stopped (descheduled). Instances in which some contexts in the set are scheduled while others are not are addressed above (see the discussion of FIG. 5).

In block 61 of FIG. 6, a skew metric associated with a set of coscheduled contexts fails to satisfy a condition (e.g., refer to the discussion of FIGS. 3 and 4, above). In block 62, in one implementation, all of the coscheduled contexts in the set are descheduled.

In block 63 of FIG. 6, in one implementation, all of the contexts in the set are scheduled concurrently (costarted), a policy that can be referred to as strict costart. In another implementation, only a subset of the contexts in the set may be scheduled and costarted at the next opportunity to do so, a policy that can be referred to as relaxed costart. In the latter implementation, another threshold value (a relaxed costart threshold), that is less than or equal to the value of the skew threshold applied in block 61, is used to select the members of the subset to be costarted. The costart threshold can be expressed as a fraction or percentage of the skew threshold. Any context with a skew metric that is above the costart threshold is selected to be a member of the subset of contexts to be costarted at the next opportunity to do so.

Like the skew threshold, the costart threshold can be per instance and/or cumulative. Also, a different costart threshold can also be defined for each context (e.g., per VM and/or per VCPU). Moreover, in a manner similar to that discussed previously herein, a choice of costart policy can also depend on the particular work being done by the contexts—if code, for example, is "coscheduling critical" then a strict costart policy can be implemented, but if the code is "coscheduling irrelevant," then a relaxed costart policy can be implemented.

In block 64, any context that has a skew metric that is above the costart threshold is scheduled to start before the remaining sibling contexts. For example, a costart threshold of zero requires strict costart, meaning that all of the contexts in the set are to be scheduled and costarted. On the other hand, if the costart threshold is 1.0 (or 100 percent), then only those contexts with a skew metric that is greater than the skew threshold are to be scheduled and costarted. A costart threshold with an intermediate value between zero and 100 percent means that only those contexts with a skew metric that exceeds a corresponding percentage of the skew threshold are to be scheduled and costarted. This latter policy can be referred to as partially relaxed costart.

The costart threshold (expressed as a fraction or percentage of the skew threshold) can be adjusted to improve system performance. Thus, the costart threshold provides explicit control over which of the contexts are to be scheduled and costarted.

When operating under a policy of relaxed or partially relaxed costart, the context scheduler will opportunistically schedule all contexts when sufficient resources are available. That is, in one implementation, the context scheduler is required to costart the subset of contexts that satisfy the costart threshold and may costart the other contexts in the set of sibling contexts.

Relaxed and partially relaxed costart can reduce the number of instances of coscheduling fragmentation because fewer physical CPUs would be needed to continue execution of a VM, for example. Thus, relaxed costop can improve overall performance.

FIG. 7 describes various coswap policies. In block 71, a set of coscheduled contexts is identified and monitored.

In block 72, in general, each context in the set is rapidly and alternately scheduled and descheduled (started and stopped) on a single physical CPU (e.g., CPU 110 of FIG. 1). In essence, small "slices" of the processor's time or cycles are alternately assigned first to one of the sibling contexts, then to a second sibling context, and so on, each sibling context taking its turn within a relatively short time quantum that is much smaller than the usual scheduling quantum. For example, while the normal scheduling quantum may be on the order of tens of milliseconds, the coswap quantum might be only one millisecond. The scheduler swaps contexts from the same set of contexts onto the same physical processor or a set of physical processors, allowing each context in the set to run at the expense of its siblings, but only for a short period of time. The amount of time available to each sibling context can be based on the skew threshold, so that the amount of skew associated with each context cannot exceed that threshold.

For example, with reference to FIG. 1, VCPU0 and VCPU1 may be associated with the same VM. If only one physical CPU is available, then neither VCPU0 nor VCPU1 may be able to run under a conventional coscheduling scheme that requires VCPU0 and VCPU1 to run concurrently. However, using the coswap policy described herein, the scheduler can schedule VCPU0 for a short period of time on the physical processor, then deschedule that VCPU and schedule VCPU1 in its place on the same physical processor. Such a coswap policy is advantageous because it permits the execution of, for example, VMs with more VCPUs than the number of available physical CPUs. In one implementation, a coswap policy may be used only when needed, in order to efficiently handle transient situations in which not enough physical CPUs are available.

In summary, methods and systems for coscheduling multiple contexts, including the definition, detection, measurement and management of skew between coscheduled contexts, are disclosed. More refined measures of skew, as well as costop, costart and coswap policies that can be implemented to reduce skew, permit relaxed coscheduling, which in turn reduces fragmentation and improves overall performance.

Although the detailed description is directed to a virtual machine environment, the present invention is not limited to being practiced only on virtual machines. In fact, the present invention is applicable to non-virtual computer systems as well. For example, the present invention can be useful for coscheduling multiple cooperating processes or threads comprising a parallel application within a conventional operating system. Furthermore, one embodiment of the present invention can be in software form stored on a DVD, disk file, or some other type of computer-readable medium.

What is claimed is:

1. A method of managing contexts that execute on a computer system, said method comprising:
    measuring a skew metric for each coscheduled context in a plurality of coscheduled contexts;
    determining that the skew metric for at least one of said plurality of coscheduled contexts exceeds a first threshold;
    in response to said determining, descheduling each of said plurality of coscheduled contexts not already descheduled; and
    after said descheduling, scheduling a subset of said plurality of coscheduled contexts, wherein said subset comprises less than all of said plurality of coscheduled contexts, and said subset comprises coscheduled contexts having a skew metric that exceeds a second threshold that is not greater than said first threshold.

2. The method of claim 1 wherein said coscheduled contexts are selected from the group consisting of: virtual processors; virtual machines; threads; and processes.

3. The method of claim 1 wherein said skew metric comprises a measure that corresponds to an amount of time that a context of said coscheduled contexts is descheduled while another of said coscheduled contexts is scheduled.

4. The method of claim 1 wherein said skew metric comprises a measure that corresponds to an amount of processing completed by a context.

5. The method of claim 4 wherein said amount of processing is adjusted to account for changes in processing speed due to resource sharing.

6. The method of claim 4 wherein said amount of processing is adjusted to account for changes in processing speed due to processor power management.

7. The method of claim 1 wherein said skew metric comprises a count of the number of instances in which a context of said coscheduled contexts is observed as being descheduled while another of said coscheduled contexts is scheduled.

8. The method of claim 1 wherein said first threshold is defined per context and said second threshold is defined per context.

9. The method of claim 1 wherein said first threshold is defined per context.

10. The method of claim 1 wherein an amount of skew is measured for a first context of said plurality of coscheduled contexts for a single occurrence in which said first context is descheduled while another of said coscheduled contexts is scheduled.

11. The method of claim 1 wherein an amount of skew is measured for a first context of said plurality of coscheduled contexts over multiple occurrences in which said first context is descheduled while another of said coscheduled contexts is scheduled.

12. A non-transitory computer-readable medium having computer-executable instructions for causing a computer system to perform a method of managing contexts, said method comprising:
    measuring a skew metric for each coscheduled context in a plurality of coscheduled contexts;
    identifying a first context in said plurality, wherein said first context has associated therewith a skew metric that exceeds a first threshold;
    in response to said identifying, descheduling all coscheduled contexts in said plurality of coscheduled contexts not already descheduled; and
    after said descheduling, scheduling a subset of said plurality of coscheduled contexts, wherein said subset comprises less than all of said plurality of coscheduled contexts, and said subset comprises coscheduled contexts having a skew metric that exceeds a second threshold that is not greater than said first threshold.

13. The computer-readable medium of claim 12 wherein said coscheduled contexts are selected from the group consisting of: virtual processors; virtual machines; threads; and processes.

14. The computer-readable medium of claim 12 wherein said skew metric comprises a measure that corresponds to an amount of time that said first context is descheduled while another of said coscheduled contexts is scheduled.

15. The computer-readable medium of claim 12 wherein said skew metric comprises a measure that corresponds to an amount of processing completed by a context.

16. The computer-readable medium of claim 12 wherein said skew metric comprises a count of the number of instances in which said first context is observed as being descheduled while another of said coscheduled contexts is scheduled.

17. The computer-readable medium of claim 12 wherein said first threshold is defined per context.

18. The computer-readable medium of claim 12 wherein an amount of skew is measured for a single occurrence in which said first context is descheduled while another of said coscheduled contexts is scheduled.

19. The computer-readable medium of claim 12 wherein an amount of skew is measured over multiple occurrences in which said first context is descheduled while another of said coscheduled contexts is scheduled.

20. A computer system comprising:
- a hardware platform comprising a processor and a memory, said hardware platform having installed thereon a plurality of virtual machines each comprising a plurality of virtual processors, said hardware platform also having installed thereon virtualization software that serves as an interface between said processor and memory and said virtual machines;
- said virtualization software comprising a scheduler operable for descheduling all contexts in a plurality of coscheduled contexts in response to a determination that a skew metric associated with any one of said plurality of coscheduled contexts exceeds a first threshold, said scheduler also operable for subsequently scheduling a subset of said plurality of coscheduled contexts, wherein said subset comprises less than all of said plurality of coscheduled contexts, and said subset comprises the coscheduled contexts having a skew metric that exceeds a second threshold that is not greater than said first threshold.

21. The computer system of claim 20 wherein said coscheduled contexts are selected from the group consisting of: said virtual processors; said virtual machines; threads; and processes.

22. The computer system of claim 20 wherein said skew metric comprises a measure that corresponds to an amount of time that a context of said coscheduled contexts is descheduled while another of said coscheduled contexts is scheduled.

23. The computer system of claim 20 wherein said skew metric comprises a measure that corresponds to an amount of processing completed by a context.

24. The computer system of claim 20 wherein said skew metric comprises a count of the number of instances in which a context of said coscheduled contexts is observed as being descheduled while another of said coscheduled contexts is scheduled.

25. The computer system of claim 20 wherein said first threshold is defined per context.

26. The computer system of claim 20 wherein an amount of skew is measured for a first context of said plurality of coscheduled contexts for a single occurrence in which said first context is descheduled while another of said coscheduled contexts is scheduled.

27. The computer system of claim 20 wherein an amount of skew is measured for a first context of said plurality of coscheduled contexts over multiple occurrences in which said first context is descheduled while another of said coscheduled contexts is scheduled.

* * * * *